United States Patent

[11] 3,573,360

[72] Inventor Marshall G. Rose, Jr.
Cupertino, Calif.
[21] Appl. No. 783,687
[22] Filed Dec. 13, 1968
[45] Patented Apr. 6, 1971
[73] Assignee Ampex Corporation
Redwood City, Calif.

[54] ELECTRONIC WEB TIMER

2 Claims, 4 Drawing Figs.

[52] U.S. Cl. .......... 178/6.6A, 179/100.2B, 179/100.2S, 346/20
[51] Int. Cl. .......... G11b 23/36, G11b 27/16, H04n 5/78
[50] Field of Search .......... 178/6.6 (A); 179/100.2 (S), (B); 346/20; 33/125 (C), 126.6, 127; 226/100; 340/259, 204; 274/(Inquired); 235/(Inquired); 324/(Inquired)

[56] References Cited

UNITED STATES PATENTS

| | | | |
|---|---|---|---|
| 3,409,895 | 11/1968 | Hayden | 346/20 |
| 3,463,877 | 8/1969 | Crum | 179/100.2 |
| 3,482,321 | 12/1969 | Inshaw | 33/125 |

FOREIGN PATENTS

| | | | |
|---|---|---|---|
| 810,111 | 3/1959 | Great Britain | 179/100.2 |

*Primary Examiner*—Bernard Konick
*Assistant Examiner*—J. Russel Goudeau
*Attorney*—Robert G. Clay

ABSTRACT: An electronic timer network for a web transport system, e.g. a video tape recorder/reproducer system. Means are incorporated for sensing the web direction and speed and providing electrical signals indicative of the direction and speed. The electrical speed indications are converted to pulses repetitious at a rate based upon segments of time, e.g. seconds or fractions of seconds. The pulses are converted to binary code format for transmission to remote locations and then decoded to decimal format to drive display units indicating the elapsed tape.

INVENTOR.
MARSHALL G. ROSE, JR.
BY Thomas [signature]
ATTORNEY

INVENTOR
MARSHALL G. ROSE, JR.
BY Thomas C. Schatzel
ATTORNEY

ELECTRONIC WEB TIMER

BACKGROUND OF THE INVENTION

The present invention relates to an electronic timer for a web transport system. Such timers are incorporated to accurately locate desired positions on the web and are commonly designed to continuously indicate the amount of relative elapsed time at which the web on the system has been running. The indications of web position may be a measure of elapsed time following the start of tape transport operation at a tape reference point or of the time remaining before a reference point is reached.

The present invention may be utilized in connection with any number of web transports, e.g. magnetic tape transports, motion film transports; etc. Herein the invention will be described and illustrated in connection with video magnetic tape transports. Heretofore, in professional video magnetic tape applications tape counters have been of mechanical and electromechanical design. Mechanical and electromechanical tape timers have been found to have low maximum count rates, limited accuracy and limited life expectancy. They are also impractical for displaying the elapsed time at locations remotely positioned from the recording system. As video recording systems have become more sophisticated it has become desirable to be able to indicate the elapsed time at remote locations. For example, in present day studios it is desirable that the control room for operating professional video tape recording systems be remotely located with respect to the actual equipment. This requires that the tape timer be located in the control room so as to be readily accessible to the operator. Obviously, mechanical and electromechanical devices for such remote applications prove complex and generally unsatisfactory.

NATURE OF THE PRESENT INVENTION

The present invention provides an electronic web timer network which has proven to provide accurate readout of tape time at the machine console and simultaneously at several remote locations. The timer is capable of providing adequate display of tape time at the various standard tape speeds and frame rates.

The present network is designed to develop an output signal of a frequency proportional to tape speed and to indicate tape motion direction. The signal, indicative of tape speed, may originate with a tachometer engaging the capstan motor and provide a plurality of pulses per revolution of the capstan. Means are also provided for sensing the tape motion direction. The output frequency of the tachometer signal is sensed by a divider network which produces pulses of a repetition rate dependent on the tape speed and amount of tape movement. For example, the rate may be 1 per second or 1 per frame. The pulses are then received by a clock. The clock continuously counts the pulses and provides output pulses according to a binary code format and indicative of the elapsed time. The binary coded signals are then delivered to a remote and/or local decoder where the signals are converted to a decimal format for driving readout devices. Provisions may further be included to indicate when the tape is at a precise position and at that point cause a change in the mode of the transport. For example, if it is desired to stop the tape at a certain frame for editing, the desired frame may be dialed in at a selection network and the tape automatically stopped at that frame.

The system may be further adapted to read tapes having an address track. The address track signals may be read directly and if not of a binary code format, converted to such format for transmission. The signals are then received by the decoders and converted for display purposed.

DESCRIPTION OF THE PREFERRED EMBODIMENT

Figure 1:
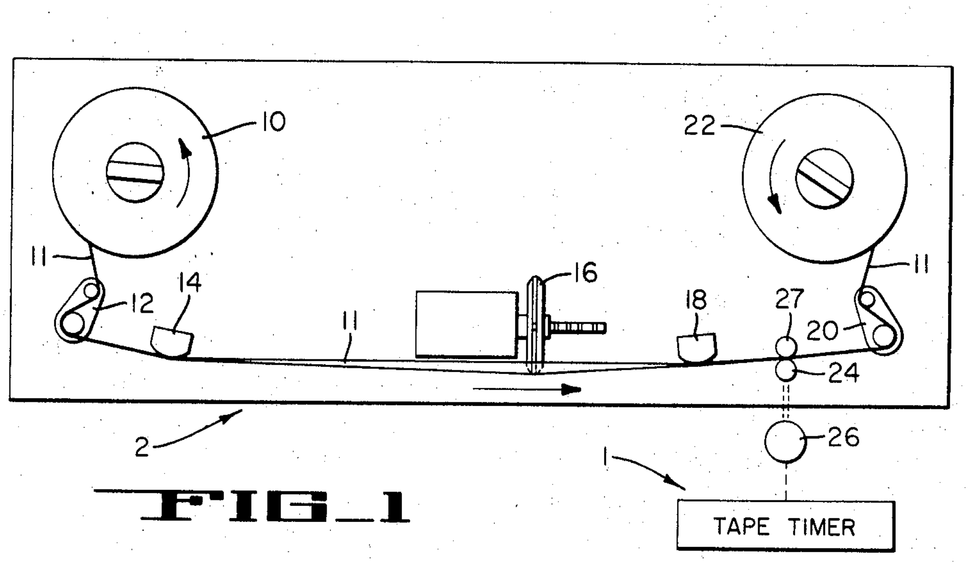
FIG. 1 is a diagrammatic representation of a video magnetic tape recorder/reproducer system of which the present invention may be a part.

The web timer of the present invention, referred to by the general reference character 1, may be utilized in connection with any of the many well-known magnetic tape recorder/reproducers such as the one represented in FIG. 1, referred to by the general reference character 2. The recorder 2 generally comprises a supply reel 10 for supporting and storing a supply of tape 11. The path of the tape 11 includes a tension device 12, a control track head 14, a video record head assembly 16, an audio head assembly 18, a tensioning device 20 and a takeup reel 22 for supporting and storing the tape 11. The tape is driven between the supply reel 10 and takeup reel 22 by means of a capstan 24 driven by a motor 26. The tape 11 is maintained in contact with the capstan by means of a pinch roller 27. Accordingly, the longitudinal tape speed depends on the capstan 24 speed.

Figure 2:
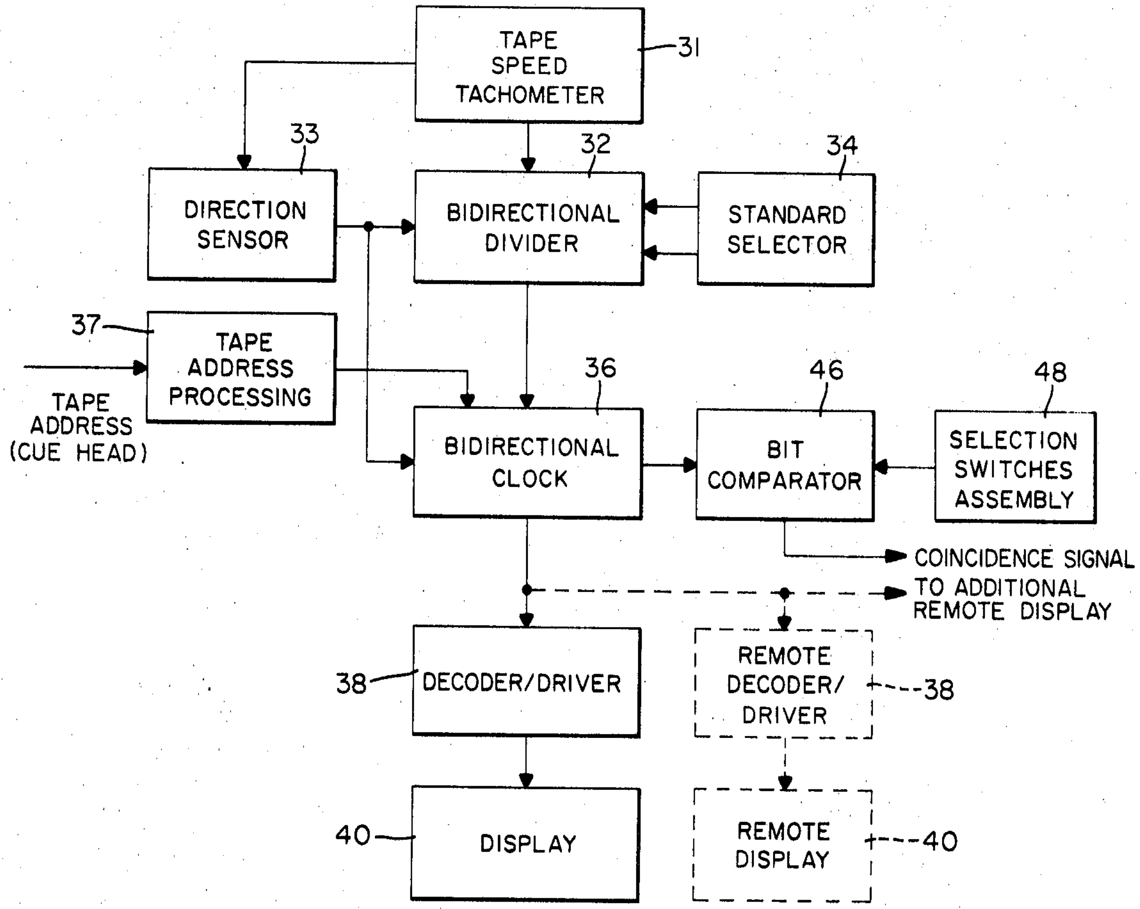
FIG. 2 is a functional block diagram of a timer system according to the present invention.

FIG. 2 represents a functional block diagram of the timer 2. A tachometer assembly 31, e.g. an optical tachometer assembly, may be coupled to the capstan motor 26 to provide electrical pulses, hereafter referred to as tach signals, representative of the actual capstan speed. The number of tach pulses per revolution depends on the makeup of the tachometer, e.g. the circumference of the tachometer and number of markings. The tach pulses are received by a bidirectional divider 32 to divide the pulses to a relative number of signals per a desired unit of time, e.g. 1 per second. A direction sensor 33 also extends to the tachometer assembly and provides a direction control signal indicative of tape direction. The bidirectional divider 32 also receives standard control signals from a tape standard selection network 34 so that the division is in accord with a select standard of tape speed, e.g. 7.5 or 15 inches per second, and television signal format, e.g. PAL, SECAM or NTSC. The direction sensor 33 also provides direction control signals to a bidirectional clock system 36 which simultaneously receives the signals from the bidirectional divider 32. The clock 36 which will be further described in detail, converts the divider signals to a binary code format for transmission over lines to remote locations. The conversion allows for a substantial decrease in the number of necessary lines. The clock 36 is also tied to a tape address processor 37 which may carry address information when a tape with a special address track code for indicating individual tape sections is utilized. The output of the clock 36 is carried to any or all of a number of local and/or remote decoder/driver networks 38 each driving a display panel 40. The decoder/driver networks 38 decode the received information and drive individual display panels indicating the tape position by elapsed time or tape address. The bidirectional clock output signal may also be received by a bit comparator 46 simultaneously receiving signals from a selection switch assembly 48. To indicate when the tape 11 is at a predetermined select position, the predetermined select position is first set in the selection assembly 48. The bit comparator 46 then compares signals representative of the select setting with that of the clock 36. The output of the bit comparator 46 indicates when coincidence occurs.

The theory of operation of the system 30 may be viewed as follows. First, it should be recalled that there are various adopted color television systems depending on the country in which the equipment is being operated. For example, the three presently recognized systems are NTSC, PAL and SECAM. The tape standard selection unit 34 provides an output signal level indicative of which standard is being utilized. For example, the color television signal system of the United States (NTSC) and Japan is based on 525 lines per frame and 30 frames per second. The PAL and SECAM systems of other countries are based on 625 lines per frame and 25 frames per second. Likewise, the tape selection unit may accommodate various tape speeds. For example, in the record or reproduce modes it is standard practice to operate at either 7.5 or 15 i.p.s. in the NTSC system and 7.8125 or 15.625 i.p.s. in the PAL and SECAM systems. Accordingly, selection unit 34 serves as a means to provide preset selection indications (normally distinct voltage levels) to the divider 32 establishing the ratio at which the divider is to divide.

The tachometer 31 provides tach pulses at a frequency coinciding with the speed of and the number of points on the tachometer. It in combination with the divider provides a means for sensing the tape movement and providing electrical pulses of a time period coinciding with a predetermined amount of tape movement. By proper selection of the tachometer diameter and number of points the time period of the tach pulses represents a precise distance of longitudinal travel of the tape. For example, in one embodiment the tachometer is of a circumference of 5 inches and 16 points. It therefore provides 48 tach pulses per second at a tape speed of 15 i.p.s. or 24 tach pulses at 7.5 i.p.s., in accord with the NTSC television signal system. Likewise, it provides 50 tach pulses per second at a tape speed of 15.625 i.p.s. or 25 tach pulses at 7.8125 i.p.s. in accord with the PAL and SECAM television signal systems. The divider 32 responds to the tach signals and divides the number according to the smallest increment of time to be displayed. Thus, if the smallest increment is one second, the division may be by 48, 24, 50 or 25 depending on the tape speed and television signal standard. Likewise, the divider 32 responds to the direction sensor 33 which provides a control signal indicative of the actual tape direction. Accordingly, when the tape direction is reversed the divider is so informed so as to take the change of direction into consideration in its count. For example, if tape direction is reversed in the middle of a revolution, there are a number of tach pulses sensed by the divider 32 but not the full number to indicate a full increment. The divider in effect subtracts the pulses of the partial increment in the initial movement in the reverse direction prior to providing full increment indications. Thus, each displayed time increment will occur at the same point on the tape in the reverse direction as in the forward direction.

Figure 3:
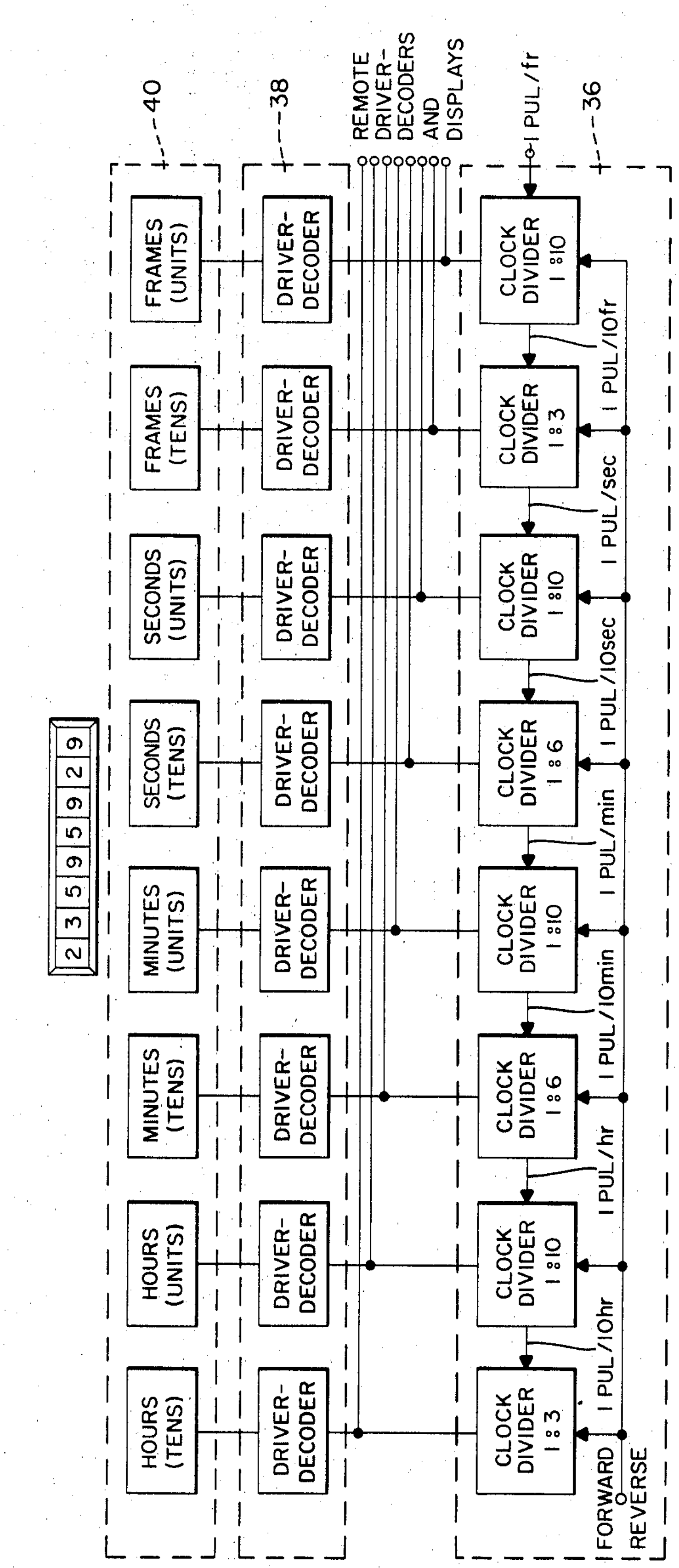
FIG. 3 further schematically illustrates a clock decoder-display arrangement of the network of FIG. 2.

Assume that it is desired to count elapsed time in television frames rather than seconds. There will be either 25 or 30 frames per second depending on the system used. Thus, the tachometer circumference and number of markings may be selected to provide 250 tach pulses per second for the PAL and SECAM standards and 240 tach pulses per second for the NTSC standard. The division may then be one-tenth or one-eighth depending on the standard so that each pulse from the divider indicates one frame. Assume NTSC is involved and that the timer display time is to range from 0 to 24 hours. As shown at the top of FIG. 3, the count will go to 23 hours, 59 minutes, 59 seconds and 29 frames by the use of eight individual display windows. This number can be indicated in binary code format by the use of 26 lines. The clock 36 receives and counts the signals from the divider 32, each indicating one frame. The clock 36 continuously counts the number of received signals and generates at its output a binary code signal providing a running time indication of the signals from the divider 32.

Viewing FIG. 3, the clock 36, driver/decoder 38 and displays 40 are illustrated in further detail. For the stated desired maximum count in frames, the clock includes eight dividers tied in tandem—four 1:10 dividers, two 1:6 dividers and two 1:3 dividers. In the illustration the desired division and arrangement is indicated. Thus, the total number of lines from the clock 36 is 26. Four lines extend from each of the four 1:10 dividers, three lines from each of the two 1:6 dividers and two lines from each of the two 1:3 dividers. Each individual divider extends to an individual driver/decoder of the driver/decoder network 38. The individual driver/decoders serve as a means for decoding the received binary coded signal to a signal appropriate for driving the associated display. There may be a number of sets of lines from the clock 36 depending on the number of remote locations at which the elapsed time is to be displayed. These lines are merely connected in parallel as indicated.

It may be desirable to have a timer system 1 wherein the tape automatically stops at a certain time. In this case, the desired time may be set by the selection switch assembly 48. The selection switch assembly 48 provides an output command signal indicative of the desired stop time. This assembly may be a thumb switch capable of providing binary code information ranging from 0 to 23 hours, 59 minutes, 59 seconds and 29 frames. The 26 lines from the selection switch assembly 48 extend to the bit comparator 46. At the same time, the binary coded output of the bidirectional clock 36 is continuously sensed by the bit comparator 46. When there is coincidence between the binary coded command signal set on the selection switches 48 and the clock 36 an output control signal, indicating coincidence, is provided by the bit comparator 46. The desired operation, e.g. start another transport to commence a dissolve or stop the transport 2, may then take place.

The present system may be further utilized in connection with a system in which the tape carries an address track with individual addresses. In this situation the tape address processing unit 37 receives the unique addresses, e.g. from a cue head assembly. The unit 37 may then control the clock 36 to provide the representative binary coded signals. In the event the output of the unit 37 is already in binary code format, e.g. the tape address itself is in binary code format, the output may be fed directly to the decoder/driver unit 38 and to the bit comparator 46. In this situation where the tape carries an address track with uniquely designated addresses there may be no need for the other units of the timer otherwise necessary for sensing the tape movement and providing an electrical pulse per predetermined amount of web movement.

Figure 4:
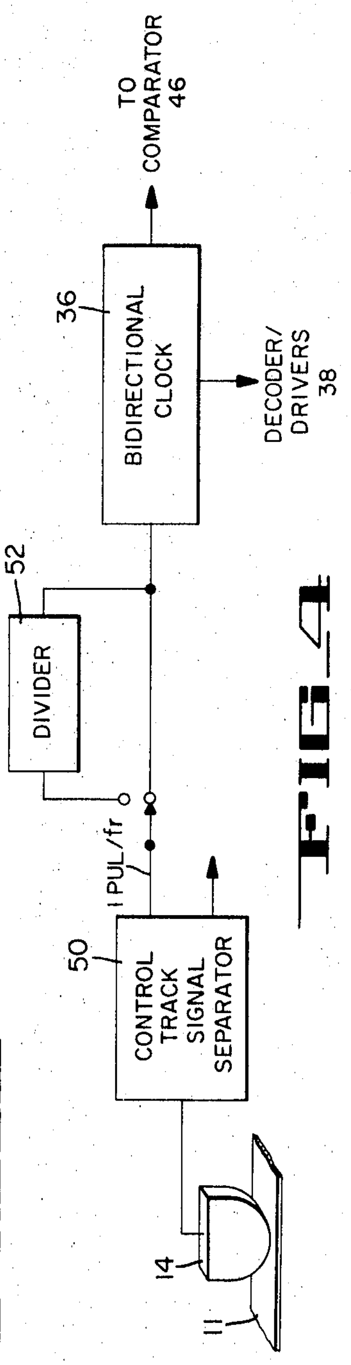
FIG. 4 is a functional block diagram of alternative means for generating pulse signals.

FIG. 4 illustrates an alternative means for generating pulse signals to the bidirectional clock 36. In this embodiment, a track on the tape 11 carrying spaced recorded pulses may be sensed. For example, recorded control track pulses sensed by the control track transducer 14 may be utilized. The control track pulses, which commonly occur at a rate coinciding with the frames, e.g. 30 per second in the NTSC system, may be processed by a control track signal separator 50. The output of the separator 50 may be fed directly to the bidirectional clock 36 if it is set up to display the time in terms of frames. If seconds are the desired increment, then a 1:30 divider may be switched in intermediate the separator 50 and clock 36. The clock 36 then responds to the received pulses to provide an electrical signal in binary code format indicative of the pulse count from the separator 50 or divider 52.

I claim:

1. In a video magnetic tape recorder system in which the tape is transported between supply and takeup storage means and means driving the tape between the storage means, in combination with a tape timer comprising:

first means sensing the tape movement and providing an electrical pulse per each predetermined increment of tape movement;

divider means connected to said first means receiving said pulses and providing a divided pulse signal having a predetermined ratio to the number of received pulses, said divider means being adjustable depending on the tape speed and video signal to provide different ratios between received pulses land the divided pulse signal issued thereby such that one electrical pulse signal is issued by said divider means for each movement of tape corresponding to a video frame;

second means connected to said divider means counting said electrical pulse signal provided thereby and issuing an electrical signal of binary code format indicating the instantaneous count registered by said second means;

direction sensing means for sensing the tape movement direction and providing a direction control signal and being connected jointly to said divider means and said second means, said direction means operating said second means to cause a change in the direction in the counting operation thereof in response to a change in the direction control signal, and when such change in direction control signal occurs during a fractional tape movement intermediate a video frame, said direction sensing means operating said divider means to delay dividing pulses until the tape is transported the corresponding fractional movement in the reverse direction; and decoder means for receiving the binary code format signals and providing drive signals to drive a display means indicating the count registered by said second means and tape position corresponding thereto.

2. The apparatus of claim 1 in which the display means is adapted to indicate a plurality of increments of time including those equivalent to the time periods of frames of the recorded video signal.